(12) United States Patent
Hufnagl et al.

(10) Patent No.: US 8,777,533 B2
(45) Date of Patent: Jul. 15, 2014

(54) BLIND FASTENER

(71) Applicant: Alcoa Inc., Pittsburgh, PA (US)

(72) Inventors: Gerhart Hufnagl, Tucson, AZ (US);
Douglas DeSalvo, Tucson, AZ (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 13/860,944

(22) Filed: Apr. 11, 2013

(65) Prior Publication Data
US 2013/0272815 A1 Oct. 17, 2013

Related U.S. Application Data

(60) Provisional application No. 61/625,235, filed on Apr. 17, 2012.

(51) Int. Cl.
| | | |
|---|---|---|
| *F16B 13/06* | (2006.01) | |
| *F16B 19/10* | (2006.01) | |
| *F16B 29/00* | (2006.01) | |

(52) U.S. Cl.
CPC ......... *F16B 19/1036* (2013.01); *F16B 19/1054* (2013.01); *F16B 29/00* (2013.01); *F16B 19/1072* (2013.01)
USPC .................................. 411/55; 411/34; 411/42

(58) Field of Classification Search
CPC .... F16B 13/061; F16B 13/065; F16B 13/124; F16B 13/066; F16B 13/0858; F16B 19/05; F16B 19/1036; F16B 19/1063; F16B 19/1072; F16B 29/00; F16B 37/067; B21J 15/045
USPC ........... 411/34, 37–40, 42–44, 55, 60.1, 60.2, 411/65
See application file for complete search history.

(56) References Cited

U.S. PATENT DOCUMENTS

| 2,863,351 | A | | 12/1958 | Vaughn | |
|---|---|---|---|---|---|
| 2,971,425 | A | * | 2/1961 | Blakeley | 411/28 |
| 3,107,572 | A | * | 10/1963 | Orloff | 411/34 |
| 3,277,771 | A | * | 10/1966 | Reynolds | 411/39 |
| 3,345,900 | A | * | 10/1967 | Villo | 411/41 |
| 3,443,474 | A | * | 5/1969 | Bergere et al. | 411/41 |
| 3,866,998 | A | * | 2/1975 | Iantorno | 439/870 |

(Continued)

OTHER PUBLICATIONS

International Search Report and Written Opinion mailed on Jul. 18, 2013 in connection with International Application No. PCT/US2013/036129 (10 pages).

(Continued)

*Primary Examiner* — Roberta Delisle
(74) *Attorney, Agent, or Firm* — Greenberg Traurig, LLP (57) ABSTRACT

A blind fastener including a core bolt having a shank with a head and a threaded portion, and a sleeve having an elongated body with a head, an internal threaded portion, and a tapered notch formed within an exterior surface thereof and defined by a tapered portion having a slope and a frictional enhanced surface. The core bolt is installed within the sleeve such that its threaded portion engages threadedly the internal threaded portion of the sleeve. During installation of the fastener within the plurality of workpieces, a bulb is formed on the elongated body of the sleeve, the bulb defining a portion of a bulbed portion. When a selected axial force is reached, the bulbed portion separates from the elongated body and engages axially the tapered portion of the sleeve, increasing the diameter of the bulb which engages a blind side of one of the workpieces.

20 Claims, 6 Drawing Sheets

(56) References Cited

U.S. PATENT DOCUMENTS

| | | | | |
|---|---|---|---|---|
| 4,312,613 | A | * | 1/1982 | Binns .............................. 411/34 |
| 4,659,271 | A | * | 4/1987 | Pratt et al. ....................... 411/43 |
| 4,832,548 | A | * | 5/1989 | Strobel ........................... 411/42 |
| 4,950,115 | A | * | 8/1990 | Sadri .............................. 411/38 |
| 5,498,110 | A | * | 3/1996 | Stencel et al. .................. 411/43 |
| 5,634,751 | A | * | 6/1997 | Stencel et al. .................. 411/43 |
| 5,816,761 | A | * | 10/1998 | Cassatt et al. ................... 411/34 |
| 6,036,418 | A | * | 3/2000 | Stencel et al. ............... 411/54.1 |
| 6,213,698 | B1 | * | 4/2001 | Cosenza .......................... 411/34 |
| 7,308,842 | B2 | * | 12/2007 | Hufnagl et al. ................... 81/55 |
| 8,297,897 | B2 | | 10/2012 | Auriol et al. |
| 8,322,015 | B2 | * | 12/2012 | Pratt et al. .................. 29/525.01 |
| 8,348,566 | B2 | * | 1/2013 | Pratt .............................. 411/38 |
| 2009/0053006 | A1 | | 2/2009 | Hufnagl |
| 2010/0074710 | A1 | | 3/2010 | Auriol et al. |

OTHER PUBLICATIONS

Huck Fasteners, An Alcoa business, 3724 East Columbia Street, Tucson, AZ 85714 Blind Bolt Engineering Standard Diagram No. UAB100-EU, SK12771, Issued Dec. 8, 2001; 4 pages.

Huck Fasteners, An Alcoa business, 3724 East Columbia Street, Tucson, AZ 85714 Blind Bolt Engineering Standard Diagram No. UAB100-MV, SK12772, Issued Dec. 13, 2001; 3 pages.

Huck Fasteners, An Alcoa business, 3724 East Columbia Street, Tucson, AZ 85714 Blind Bolt Engineering Standard Diagram No. UABP-EU, SK12756, Issued Sep. 20, 2001; 4 pages.

Alcoa Fastening Systems, 3724 East Columbia Street, Tucson, AZ 85714 Blind Bolt Engineering Standard Diagram No. UAB130-EU, SK12711, Issued Jan. 31, 2001; 4 pages.

Alcoa Fastening Systems, 3724 East Columbia Street, Tucson, AZ 85714 Blind Bolt Engineering Standard Diagram No. UAB130-MV, SK12742, Issued Jul. 12, 2001; 3 pages.

Alcoa Fastening Systems, 3724 East Columbia Street, Tucson, AZ 85714 Blind Bolt Engineering Standard Diagram No. UAB6127-EU, SK12770, Issued Dec. 8, 2001; 3 pages.

Alcoa Fastening Systems, 3724 East Columbia Street, Tucson, AZ 85714 Blind Bolt Engineering Standard Diagram No. OUAB130-EU, SK12801, Issued Apr. 19, 2004; 4 pages.

Alcoa Fastening Systems, 3724 East Columbia Street, Tucson, AZ 85714 Blind Bolt Engineering Standard Diagram No. OUAB6127-EU, SK12802, Issued Apr. 19, 2004; 3 pages.

Alcoa Fastening Systems, 3724 East Columbia Street, Tucson, AZ 85714 Blind Bolt Engineering Standard Diagram No. OUABP-EU, SK12803, Issued Apr. 19, 2004; 4 pages.

\* cited by examiner

BLIND FASTENER

CROSS-REFERENCE TO RELATED APPLICATION

This application is a Section 111(a) application relating to and claiming the benefit of commonly owned, U.S. Provisional Patent Application Ser. No. 61/625,235 entitled "BLIND FASTENER," filed Apr. 17, 2012, the entirety of which is incorporated herein by reference.

FIELD OF THE INVENTION

The present invention relates to a fastener and, more particularly, a blind fastener for securing workpieces together.

BACKGROUND OF THE INVENTION

Blind fasteners are commonly used to secure a plurality of workpieces together when it is difficult or impossible to access the blind side of one of the workpieces. In certain applications, it is desirable that bulbed sleeves used in conjunction with such fasteners have relatively large footprints that engage the blind side of the one of the workpieces.

SUMMARY

In an embodiment, a blind fastener including a core bolt having an elongated shank with a first end, a second end opposite the first end, a head located at the first end, and a threaded portion located at the second end; and a sleeve having an elongated body with a first end, a second end opposite the first end of the elongated body, an exterior surface extending from the first end of the elongated body to the second end of the elongated body, a head located at the first end of the elongated body, an internal threaded portion located at the second end of the elongated body, and a tapered notch formed within the exterior surface intermediate the first and second ends of the elongated body and defined by a tapered portion, wherein the core bolt is adapted to be installed within the sleeve such that the threaded portion of the core bolt engages threadedly the internal threaded portion of the sleeve, wherein the fastener is adapted to be installed within openings of a plurality of workpieces, such that the head of the sleeve engages an accessible side of one of the plurality of workpieces, the head of the pin engages the head of the sleeve, and the second end of the elongated body of the sleeve extends from a blind side of another of the workpieces, wherein during installation of the fastener within the plurality of workpieces, a bulb is formed on the elongated body of the sleeve, the bulb defining a portion of a bulbed portion which extends from the bulb to the second end of the elongated body of the sleeve, wherein when a selected axial force applied to the fastener is reached, the bulbed portion separates from the elongated body and thereafter engages the tapered portion axially and in a direction towards the first end of the elongated body, thereby increasing the diameter of the bulb, and wherein when the fastener is in an installed position, the bulb engages the blind side of the another of the workpieces.

In an embodiment, the core bolt includes a second head extending axially from the first head of the core bolt, and a breakneck groove formed between the first and second heads of the core bolt, and wherein when the fastener is in its installed position, the second head is fractured from the first head at the breakneck groove.

In an embodiment, the bulb is formed prior to the separation of the bulbed portion from the elongated body. In an embodiment, the sleeve includes an annealed portion to facilitate formation of the bulb. In an embodiment, the bulbed portion is adapted to separate from the elongated body proximate to the tapered notch. In an embodiment, the tapered portion includes a frictional enhanced surface that is adapted to inhibit rotation of the bulbed portion relative to the elongated body after the bulbed portion separates from the elongated body. In an embodiment, the frictional enhanced surface includes knurling. In an embodiment, the frictional enhanced surface includes abrading. In an embodiment, the frictional enhanced surface includes a plurality of notches.

In an embodiment, the tapered portion has a slope in a range of about 5 degrees to about 30 degrees. In an embodiment, the tapered portion has a slope of about 5 degrees. In an embodiment, the tapered portion has a slope of about 10 degrees. In an embodiment, the tapered portion has a slope of about 15 degrees. In an embodiment, the tapered portion has a slope of about 20 degrees. In an embodiment, the tapered portion has a slope of about 25 degrees. In an embodiment, the tapered portion has a slope of about 30 degrees. In an embodiment, the bulb includes a diameter that is at least one and one-half times a diameter of the fastener. In an embodiment, the bulb includes a diameter that is at least two times a diameter of the fastener.

DETAILED DESCRIPTION OF THE DRAWINGS

Figure 1:
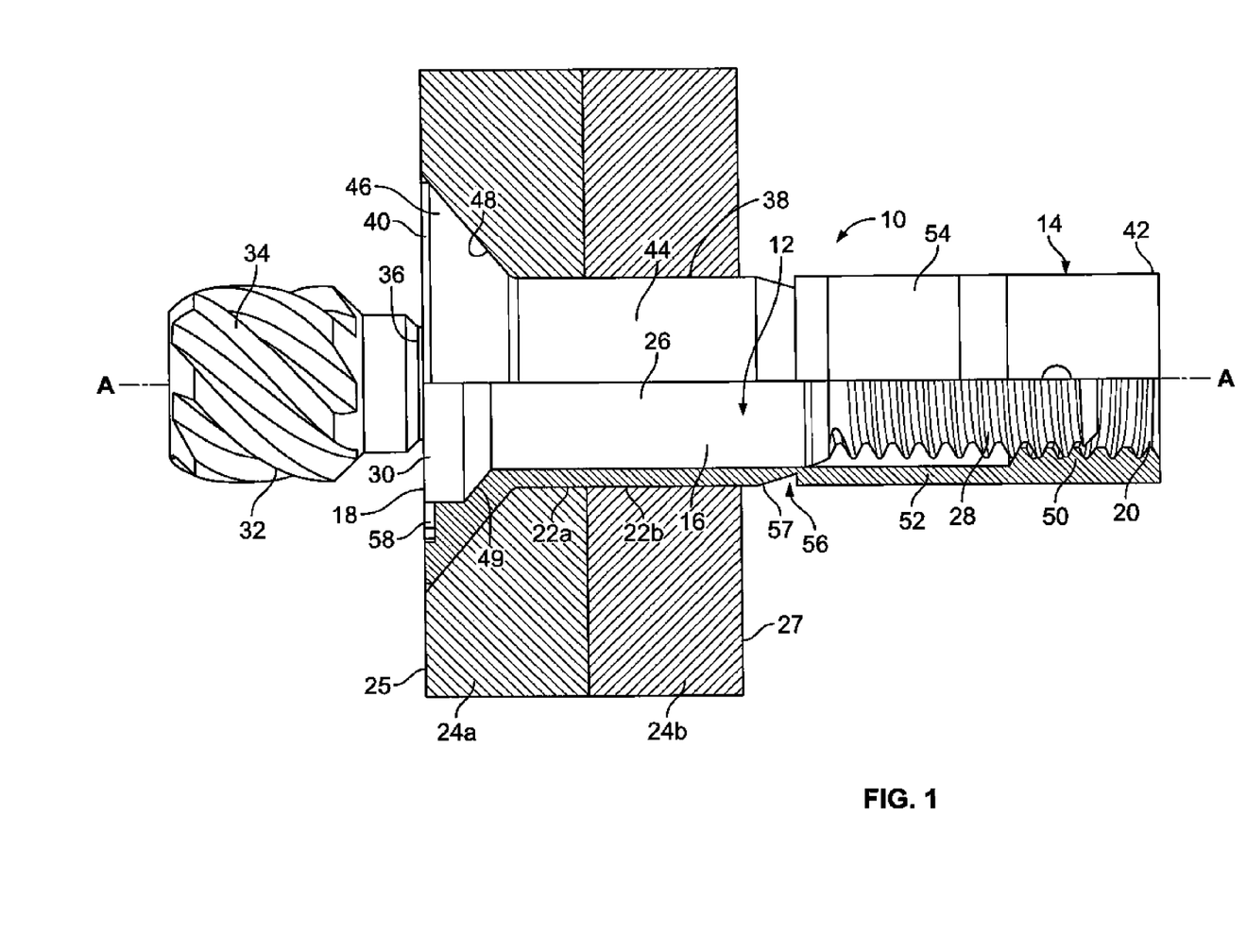
FIG. 1 is a partially cross-sectioned, side elevational view of a blind fastener constructed in accordance with an embodiment, the fastener being shown in an uninstalled position within a plurality of workpieces and at a maximum grip length.

FIG. 1 illustrates an embodiment of a blind fastener 10. In an embodiment, the fastener 10 includes a core bolt 12 and a cylindrical sleeve 14 that is sized and shaped to receive the core bolt 12. In an embodiment, the sleeve 14 is of one-piece construction when the fastener 10 is within an initial stage of an uninstalled position. In an embodiment, the sleeve 14 is adapted to be separated into two portions or segments, which will be described in greater detail below. In an embodiment, the core bolt 12 includes an elongated shank 16 having a first end 18 and a second end 20 opposite the first end 18, and which is sized and shaped to extend through the sleeve 14. In an embodiment, the sleeve 14 is sized and shaped to be inserted within openings 22a, 22b of a plurality of workpieces 24a, and 24b, respectively. In an embodiment, the workpiece 24a includes an accessible side 25, while the workpiece 24b includes a blind side 27 opposite the accessible side 25. In certain embodiments, the workpieces 24a, 24b are made of aluminum, an aluminum alloy, other metallic alloys, composites, or combinations thereof.

In an embodiment, the shank 16 includes a smooth cylindrical portion 26 and a threaded portion 28 located at the second end 20 of the shank 16. In an embodiment, the threaded portion 28 of the shank 16 includes a diameter that is less than a diameter of the smooth portion 26 of the shank 16. In an embodiment, the core bolt 12 includes a first head 30 located at the first end 18 of the shank 16 and adjacent to the smooth portion 26. In an embodiment, the first head 30 is frustoconical in shape. In an embodiment, adjacent to the first head 30 and also forming a portion of the core bolt 12 is a frangible, second head 32. In an embodiment, the second head 32 includes splines or threads 34 that are engageable by a suitable driver attached to an installation tool (not shown in the Figures). In an embodiment, the first and second heads 30, 32 are formed integrally. In an embodiment, intermediate the first and second heads 30, 32 is a breakneck groove 36 that defines the weakest point of the core bolt 12. In an embodiment, the second head 32 is adapted to fracture torsionally or rotationally and separate from the first head 30 at the breakneck groove 36 in torsional/rotational shear in response to the rotational force applied to second head 32 after the fastener 10 has been installed in the workpieces 24a, 24b, thereby providing the core bolt 12 with a flush configuration relative to the sleeve 14 after the fastener 10 has been set. In certain embodiments, the core bolt 12 may have a structure and function such as any one of the pin members disclosed in U.S. Pat. No. 6,868,757 (the "'757 patent) and U.S. Pat. No. 7,308,842 (the "'842 patent"), both of which are incorporated herein by reference in their entireties.

Still referring to FIG. 1, in an embodiment, the sleeve 14 includes an elongated body 38 having a first end 40 and a second end 42 opposite the first end 40. In an embodiment, the body 38 has a cylindrical shape and a smooth exterior surface 44. In certain embodiments, the body 38 has a diameter that provides a slight clearance fit or a press fit through the openings 22a, 22b of the workpieces 24a, 24b. In an embodiment, the sleeve 14 includes a head 46 at the first end 40 of the body 38. In an embodiment, the head 46 of the sleeve is sunk flush with an outer surface 48 of the accessible side 25 of the workpiece 24a. In another embodiment, the head 46 protrudes from the outer surface 48 of the accessible side 25 of the workpiece 24a. In an embodiment, the head 46 may include a round head, hex head or other suitable shape that is well known in the fastener art. In an embodiment, the head 30 of the core bolt 12 is adapted to sit on an annular, outwardly facing seat 49 on the head 46 of the sleeve 14. In an embodiment, the seat 49 is frustoconical in shape and complementarily tapered to that of the head 30 of the core bolt 12 so that the core bolt 12 is countersunk into the sleeve 14.

With continued reference to FIG. 1, in an embodiment, the sleeve 14 has an internal threaded portion 50 located at the second end 42 of the sleeve 14 and an internal smooth portion 52 juxtaposed with the threaded portion 50 and extending intermediate the first and second ends 40, 42. In an embodiment, the internal threaded portion 50 is adapted to engage threadedly the threaded portion 28 of the core bolt 12. In an embodiment, the internal threaded portion 50 of the sleeve 14 has a thickness that is greater than a thickness of the internal smooth portion 52 of the sleeve 14. In an embodiment, an annealed portion 54 on the body 38 of the sleeve 14 is locally induction annealed in order to facilitate formation of a bulb 55, which will be described below in further detail. In an embodiment, the annealed portion 54 additionally facilitates formation of the bulb 55 against the surface of the blind side 27 of the workpiece 24b in all grip ranges of the fastener 10.

Still referring to FIG. 1, in an embodiment, the exterior surface 44 of the sleeve 14 includes a tapered notch 56 formed therein and located intermediate the first and second ends 40, 42 of the sleeve 14. In an embodiment, the notch 56 forms a conically tapered portion 57. In an embodiment, the sleeve 14 is machined to form the notch 56 and the tapered portion 57. In an embodiment, as measured from a longitudinal axis A-A of the fastener 10, the tapered portion 57 has a slope in a range of about 5° to about 30°. In an embodiment, the tapered portion 57 has a slope of about 5°. In an embodiment, the tapered portion 57 has a slope of about 10°. In an embodiment, the tapered portion 57 has a slope of about 15°. In an embodiment, the tapered portion 57 has a slope of about 20°. In an embodiment, the tapered portion 57 has a slope of about 25°. In an embodiment, the tapered portion 57 has a slope of about 30°. In an embodiment, the tapered portion 57 is knurled, abraded, notched, or provided within any number of alternative frictional enhanced surfaces. The purpose and function of the tapered portion 57 shall be described hereinafter.

With continued reference to FIG. 1, in an embodiment, the head 46 of the sleeve 14 includes a plurality of recesses 58 disposed therein that are adapted to receive a plurality of protruding nibs of a nose of an installation tool, such as that shown in the '757 patent and the '842 patent. In an embodiment, the plurality of recesses 58 is disposed in the head 46 of the sleeve 14 in a generally circular orientation. In another embodiment, the recesses 58 can be formed in any configuration that allows the head 46 of the sleeve 14 to be engaged with the nibs of the installation tool, such as in the orientation of a hexagon, a square, a cross-slot configuration, or a single slot configuration.

Figure 2:
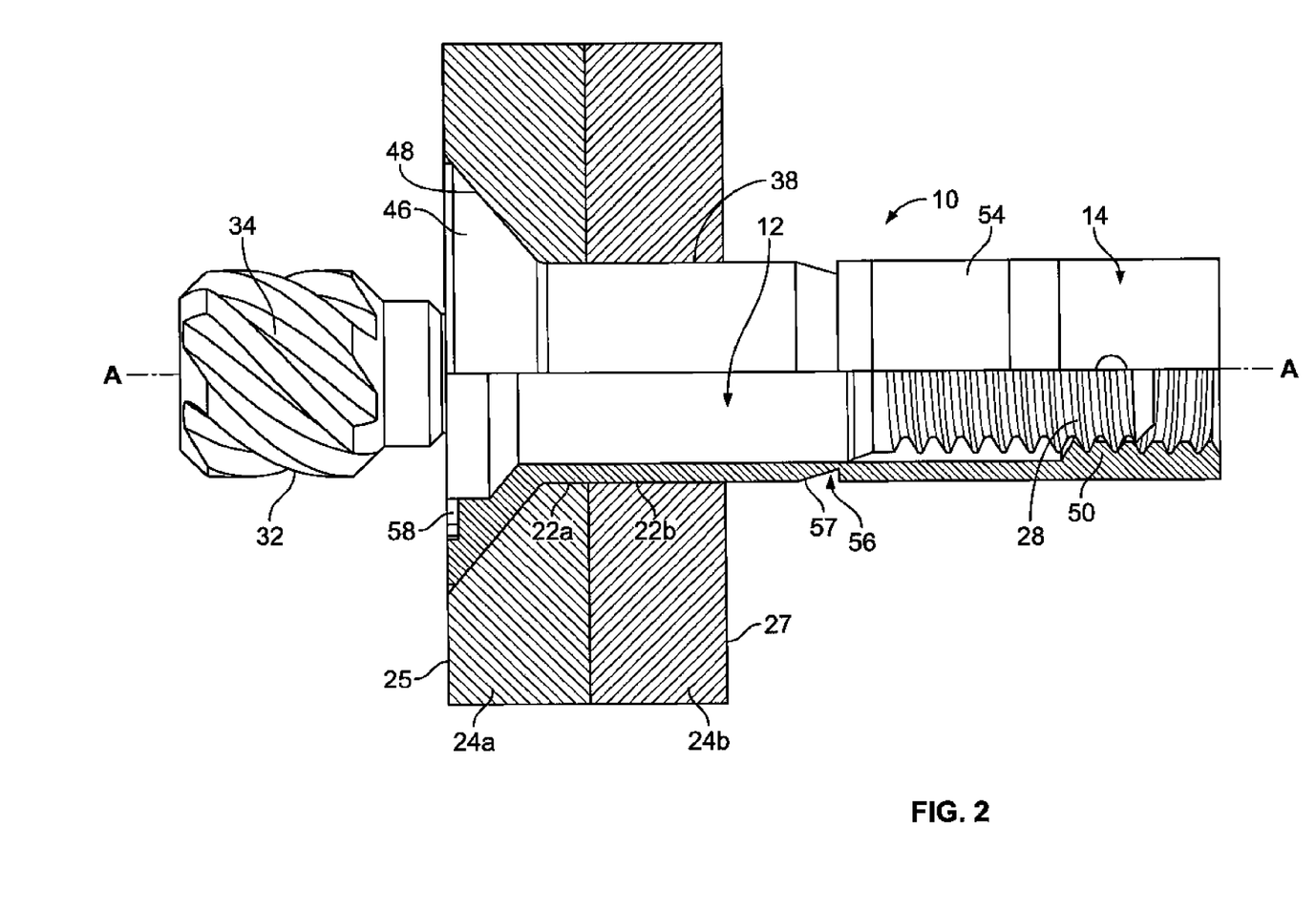
FIG. 2 is a partially cross-sectioned, side elevational view of the blind fastener shown in FIG. 1, the fastener being shown in an uninstalled position within the workpieces but at a minimum grip length.

In an embodiment, prior to installing the fastener 10 into the workpieces 24a, 24b, the fastener 10 is assembled. Referring to FIGS. 1 and 2, in an embodiment, the fastener 10 is assembled by inserting the core bolt 12 into the sleeve 14 and threading the threaded portion 28 of the core bolt 12 with the threaded portion 50 of the sleeve 14. In an embodiment, the fastener 10 is inserted through the openings 22a, 22b of the workpieces 24a, 24b, and the first head 46 of the sleeve 14 is received against the outer surface 48 of the accessible side 25 of the workpiece 24a, and at least a portion of the body 38 of the sleeve 14 projects outwardly from the workpiece 24b and is adjacent to the outer surface of the blind side 27 of the workpiece 24b. In an embodiment, the annealed portion 54 and the notch 56 and the tapered portion 57 extend beyond the outer surface of the blind side 27 of the workpiece 24b. In an embodiment, FIG. 1 shows the maximum grip of the fastener 10, while FIG. 2 shows the minimum grip of the fastener 10 for workpieces 124a, 124b that have less of a total thickness than those shown in FIG. 1.

Figure 3:
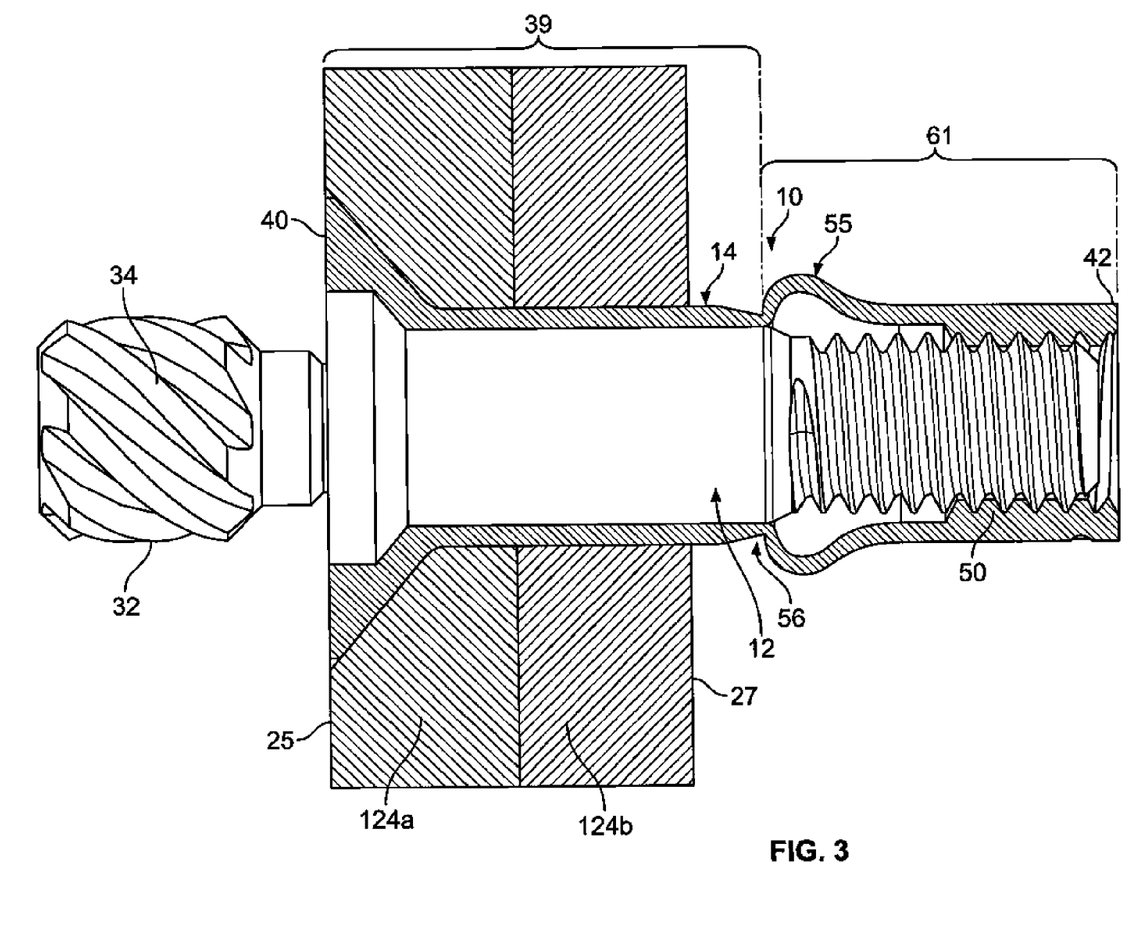
FIG. 3 is a partially cross-sectioned, side elevational view of the blind fastener shown in FIG. 1 being installed within the workpieces during a bulb formation step of a fastener installation sequence.

In an embodiment, a rotary installation tool having a nose assembly (not shown in the Figures) is provided to set the fastener 10. In an embodiment, the splines or threads 34 of the second head 32 of the core bolt 12 are engaged with complementary splines or threads of a driver of the tool (not shown in the Figures). In an embodiment, upon actuation of the tool by the end-user, the splined engagement between the core bolt 12 and nose assembly simultaneously pulls the nose assembly towards the fastener 10 during actuation of the tool to ensure proper engagement of the nibs with the recesses 58 and rotatably torques the core bolt 12 to effectively form the bulb 55, as shown in FIG. 3. In an embodiment, the formation of the bulb 55 commences at the diameter of the sleeve 14. In an embodiment, the formation of the bulb 55 occurs proximate to the notch 56. In an embodiment, formation of the bulb 55 starts in the same location on the sleeve 14, regardless of the structural grip (e.g., maximum grip, minimum grip, or therebetween), and, therefore, allowing the annealed portion 54 (as shown in FIGS. 1 and 2) to have a shorter width and be applied to a more targeted area on the sleeve 14. In an embodiment, the formation of the bulb 55 defines the body 38 as two segments: a bulbed portion 61, which extends from the bulb 55 to the second end 42 of the body 38, and a body portion 39, which extends from the bulb 55 to the first end 40 of the body 38. In an embodiment, rotation of the bulbed portion 61, and thus the internal threaded portion 50 of the sleeve 14, is prevented because the bulbed portion 61 and the body portion 39 remain integral during this stage of the installation of the fastener 10.

Figure 4:
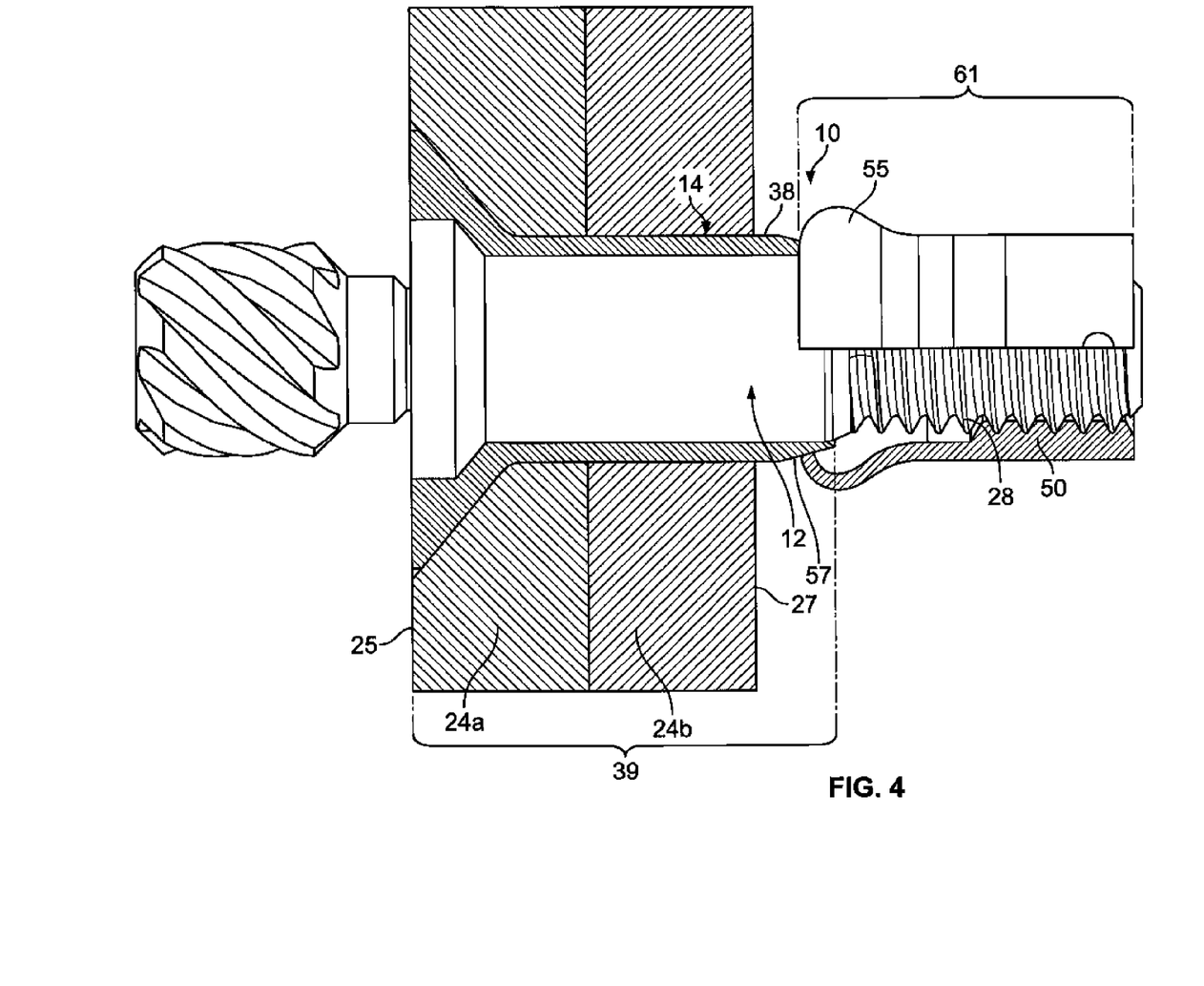
FIG. 4 is a partially cross-sectioned, side elevational view of the blind fastener shown in FIG. 3 being installed within the workpiece during a bulb shearing step of a fastener installation sequence.
Figure 5:
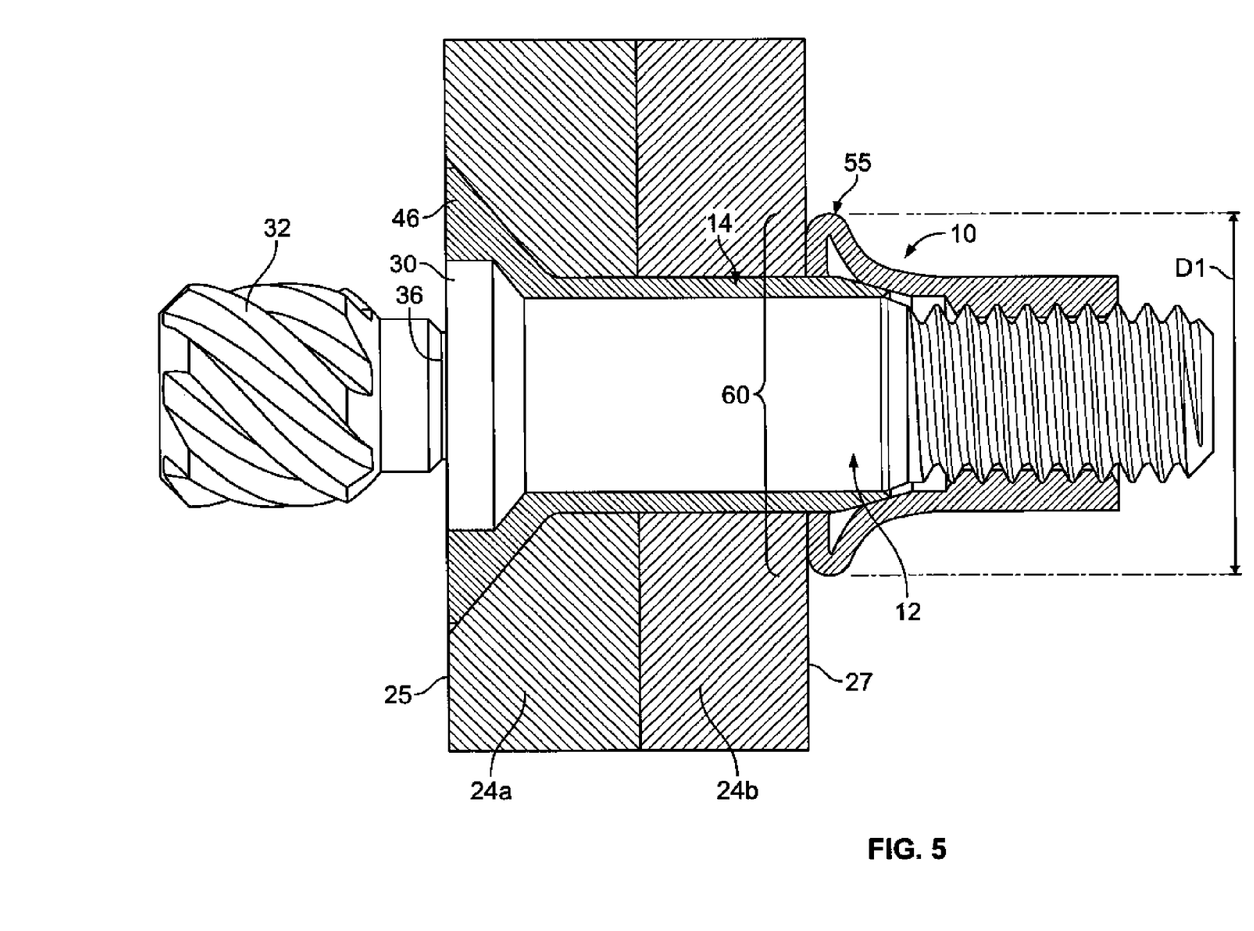
FIG. 5 is a partially cross-sectioned, side elevational view of the blind fastener shown in FIG. 4, the fastener being shown in an installed position at a maximum grip length.
Figure 6:
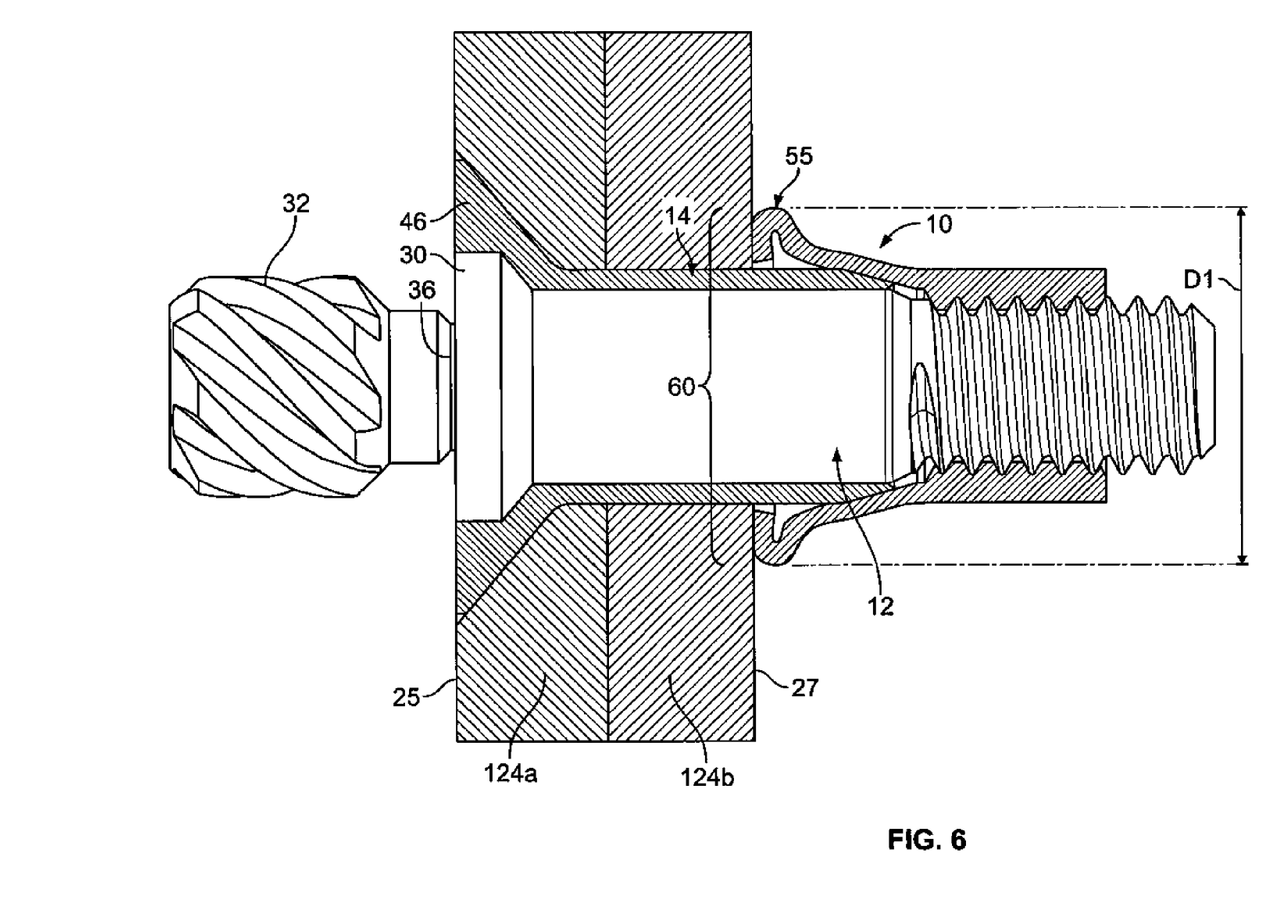
FIG. 6 is a partially cross-sectioned, side elevational view of the blind fastener shown in FIG. 2, the fastener being shown in an installed position but at a minimum grip length.

Referring to FIG. 4, when a selected axial force applied on the fastener 10 is reached, the bulbed portion 61 (and thus the bulb 55 and the threaded portion 50) of the sleeve 14 is sheared off the body 38 at a location proximate to the notch 56 and the tapered portion 57, thus forming the separate and distinct bulbed portion 61 and the body portion 39 (which is now the remaining portion of the body 38 after the bulbed portion 61 is sheared off). In an embodiment, when the bulbed portion 61 is sheared off, it is forced up the tapered portion 57. In an embodiment, as described above, the tapered portion 57 is provided with knurling, abrading, notching or frictional enhanced surfaces to promote engagement of the bulbed portion 61 with the body portion 39, and insure that the bulbed portion 61 and the core bolt 12 will not turn together upon rotation of the core bolt 12. Moreover, in an embodiment, after the bulbed portion 61 is sheared off the body 38, rotation of the bulbed portion 61 relative to the body portion 39 is prevented by friction due to the existence of the knurling, abrading, notching or frictional enhanced surfaces on the tapered portion 57. In an embodiment, the threaded portion 28 of the core bolt 12 continues to threadedly engage the threaded portion 50 of the sleeve 14, drawing the bulbed portion 61 along the body portion 39 and closer to the surface of the blind side 27 of the workpiece 24b. The diameter of the bulb 55 increases as the bulbed portion 61 is forced up the tapered portion 57. Referring to FIG. 5, in an embodiment, the bulb 55 is then forced against the blind side 27 of the workpiece 24b and flattens out, growing in diameter to its final shape which develops a footprint or bearing surface 60 against the blind side 27. In an embodiment, the footprint 60 has an external diameter D1 that is at least 1.5 times the diameter of the fastener 10 (e.g., the nominal shank diameter of the fastener 10). In an embodiment, the footprint 60 has a diameter D1 that is at least 2 times the diameter of the fastener 10. When the bulb 55 is fully formed, further rotation of the core bolt 12 ceases. At this point, a torsional load builds up in the core bolt 12 and the break neck groove 36 will fracture in torsional or rotational shear and the second head 32 will break off at the breakneck groove 36 (which shown in FIGS. 1, 5 and 6). In an embodiment, the head 30 of the core bolt will be flush with the head 46 of the sleeve 14. In an embodiment, the workpieces 24a, 24b are not exposed to high peak buckling loads during installation of the fastener 10. In an embodiment, since formation of the bulb 55 is initiated prior to the separation of the bulbed portion 61 from the body portion 38, the compressive load on the workpieces 24a, 24b is substantially reduced, and the indentations in the contact surface, created by bulb formation forces, are reduced. FIG. 6 shows the fastener 10 installed within the workpieces 124a, 124b, but at a minimum grip length.

It should be understood that the embodiments described herein are merely exemplary and that a person skilled in the art may make many variations and modifications without departing from the spirit and scope of the invention. In an embodiment, the fastener 10 may be a pull-type blind fastener or a threaded type blind fastener. In an embodiment, the fastener 10 is used in aerospace applications. In another embodiment, the fastener 10 is used in industrial applications. Accordingly, all such variations and modifications are intended to be included within the scope of the embodiments described and claimed herein.

What is claimed is:

1. A blind fastener, comprising:
   a core bolt having an elongated shank with a first end, a second end opposite the first end, a head located at the first end, and a threaded portion located at the second end; and
   a sleeve having an elongated body with a first end, a second end opposite the first end of the elongated body, an exterior surface extending from the first end of the elongated body to the second end of the elongated body, a head located at the first end of the elongated body, an internal threaded portion located at the second end of the elongated body, and a tapered notch formed within the exterior surface intermediate the first and second ends of the elongated body and defined by a tapered portion,
   wherein the core bolt is adapted to be installed within the sleeve such that the threaded portion of the core bolt engages threadedly the internal threaded portion of the sleeve,
   wherein the fastener is adapted to be installed within openings of a plurality of workpieces, such that the head of the sleeve engages an accessible side of one of the plurality of workpieces, the head of the core bolt engages the head of the sleeve, and the second end of the elongated body of the sleeve extends from a blind side of another of the workpieces,
   wherein during installation of the fastener within the plurality of workpieces, a bulb is formed on the elongated body of the sleeve, the bulb defining a portion of a bulbed portion which extends from the bulb to the second end of the elongated body of the sleeve, and wherein a remaining portion of the elongated body extending from the bulb to the first end of the elongated body defines a body portion, wherein the bulbed portion and the body portion are connected integrally with one another,
   wherein when a selected axial force applied to the fastener is reached, the bulbed portion separates from the body portion and thereafter engages the tapered portion axially and in a direction towards the first end of the elongated body, thereby increasing the diameter of the bulb, and
   wherein when the fastener is in an installed position, the bulb engages the blind side of the another of the workpieces.

2. The blind fastener of claim 1, wherein the bulb is formed prior to the separation of the bulbed portion from the body portion.

3. The blind fastener of claim 2, wherein the sleeve includes an annealed portion to facilitate formation of the bulb.

4. The blind fastener of claim 3, wherein the bulbed portion is adapted to separate from the body portion proximate to the tapered notch.

5. The blind fastener of claim 4, wherein the tapered portion includes a frictional enhanced surface that is adapted to inhibit rotation of the bulbed portion relative to the body portion after the bulbed portion separates from the body portion.

6. The blind fastener of claim 5, wherein the frictional enhanced surface includes knurling.

7. The blind fastener of claim 5, wherein the frictional enhanced surface includes abrading.

8. The blind fastener of claim 5, wherein the frictional enhanced surface includes a plurality of notches.

9. The blind fastener of claim 5, wherein the tapered portion has a slope in a range of about 5 degrees to about 30 degrees.

10. The blind fastener of claim 5, wherein the tapered portion has a slope of about 5 degrees.

11. The blind fastener of claim 5, wherein the tapered portion has a slope of about 10 degrees.

12. The blind fastener of claim 5, wherein the tapered portion has a slope of about 15 degrees.

13. The blind fastener of claim 5, wherein the tapered portion has a slope of about 20 degrees.

14. The blind fastener of claim 5, wherein the tapered portion has a slope of about 25 degrees.

15. The blind fastener of claim 5, wherein the tapered portion has a slope of about 30 degrees.

16. The blind fastener of claim 1, wherein the bulb includes a diameter that is at least one and one-half times a diameter of the fastener.

17. The blind fastener of claim 1, wherein the bulb includes a diameter that is at least two times a diameter of the fastener.

18. The blind fastener of claim 1, wherein the core bolt includes a second head extending axially from the first head of the core bolt, and a breakneck groove formed between the first and second heads of the core bolt, and wherein when the fastener is in its installed position, the second head is fractured from the first head at the breakneck groove.

19. The blind fastener of claim 1, wherein the elongated body of the sleeve is adapted to absorb a peak buckling load during installation of the blind fastener, thereby minimizing indentations in at least one of the plurality of workpieces.

20. A blind fastener, comprising:
  a core bolt having an elongated shank with a first end, a second end opposite the first end, a first head located at the first end, a second head extending axially from the first head, a breakneck groove formed between the first and second heads, a threaded portion located at the second end; and
  a sleeve having an elongated body with a first end, a second end opposite the first end of the elongated body, an exterior surface extending from the first end of the elongated body to the second end of the elongated body, a head located at the first end of the elongated body, an internal threaded portion located at the second end of the elongated body, a tapered notch formed within the exterior surface intermediate the first and second ends of the elongated body and defined by a tapered portion having a frictional enhanced surface and a slope in a range of about 5 degrees to about 30 degrees, and an annealed portion located intermediate the first and second ends of the elongated body,
  wherein the core bolt is adapted to be installed within the sleeve such that the threaded portion of the core bolt engages threadedly the internal threaded portion of the sleeve,
  wherein the fastener is adapted to be installed within openings of a plurality of workpieces, such that the head of the sleeve engages an accessible side of one of the plurality of workpieces, the head of the core bolt engages the head of the sleeve, and the second end of the elongated body of the sleeve extends from a blind side of another of the workpieces,
  wherein during installation of the fastener within the plurality of workpieces, a bulb is formed on the elongated body of the sleeve, the bulb defining a portion of a bulbed portion which extends from the bulb to the second end of the elongated body of the sleeve, and wherein a remaining portion of the elongated body extending from the bulb to the first end of the elongated body defines a body portion, and wherein the bulbed portion and the body portion are connected integrally with one another,
  wherein when a selected axial force applied to the fastener is reached, the bulbed portion separates from the body portion and thereafter engages the tapered portion axially and in a direction towards the first end of the elongated body, thereby increasing the diameter of the bulb,
  wherein when the fastener is in an installed position, the bulb engages the blind side of the another of the workpieces, the bulb including a diameter that is at least one and one-half times a diameter of the fastener, and
  wherein when the fastener is in its installed position, the second head of the core bolt is fractured from the first head of the core bolt at the breakneck groove.

* * * * *

UNITED STATES PATENT AND TRADEMARK OFFICE
CERTIFICATE OF CORRECTION

PATENT NO. : 8,777,533 B2
APPLICATION NO. : 13/860944
DATED : July 15, 2014
INVENTOR(S) : Gerhart Hufnagl et al.

Page 1 of 1

It is certified that error appears in the above-identified patent and that said Letters Patent is hereby corrected as shown below:

In the Specification

Column 1, line 59, delete "the" before "another".

Signed and Sealed this
Twenty-eighth Day of April, 2015

Michelle K. Lee
*Director of the United States Patent and Trademark Office*